United States Patent [19]
Carlin et al.

[11] Patent Number: 5,421,193
[45] Date of Patent: Jun. 6, 1995

[54] METHOD AND APPARATUS FOR LEAK DETECTION WITH FLOAT EXCITATION AND SELF-CALIBRATION

[75] Inventors: John A. Carlin, Denver; James L. Wolf, Littleton, both of Colo.

[73] Assignee: ProEco, Inc., Tampa, Fla.

[21] Appl. No.: 175,641

[22] Filed: Dec. 30, 1993

[51] Int. Cl.6 .................... G01F 23/30; G01B 7/26; G01M 3/32
[52] U.S. Cl. .................... 73/49.2; 73/1 H; 73/314; 324/207.13
[58] Field of Search .............. 73/49.2, 314, 319, 1 H; 324/207.13, 207.24; 340/624

[56] References Cited

U.S. PATENT DOCUMENTS

| | | | |
|---|---|---|---|
| 4,850,223 | 7/1989 | Carlin et al. | 73/49.2 |
| 5,017,867 | 5/1991 | Dumais et al. | 73/314 |
| 5,156,042 | 10/1992 | Carlin et al. | 73/49.2 |
| 5,209,106 | 5/1993 | Carlin | 73/49.2 |
| 5,220,310 | 6/1993 | Pye | 340/624 |
| 5,258,707 | 11/1993 | Begin et al. | 324/207.13 |

Primary Examiner—Hezron E. Williams
Assistant Examiner—Michael J. Brock
Attorney, Agent, or Firm—Dorr, Carson, Sloan & Peterson

[57] ABSTRACT

A leak detector including a float having a number of magnets connected to the float. Electromagnetic coils are disposed along a length of the possible range of travel of the float within the leak detector. The coils, when energized, interact with the magnet making the float move-about and settle to a position representing its true equilibrium buoyancy. Optionally, the leak detector includes a self-calibration apparatus that provides a reference signal indicting the fixed position of the self-calibration apparatus, allowing the leak detector to compensate for offset errors.

29 Claims, 7 Drawing Sheets

METHOD AND APPARATUS FOR LEAK DETECTION WITH FLOAT EXCITATION AND SELF-CALIBRATION

BACKGROUND OF THE INVENTION

1. Field of the Invention

The present invention relates, in general, to fluid storage tank monitoring and, more particularly, to a float excitation system which efficiently minimizes the effects of fluid surface tension, allowing float to settle into the fluid to its true buoyancy for high precision leak detection.

2. Statement of the Problem

Leaking fluid product storage tanks represent a significant economic and environmental concern. Product leaks waste valuable product fluid stored in the tanks. Moreover, such leaks can cause water and possibly soil to contaminate the product fluid stored in the tank. More importantly, leaking fluid product storage tanks result in contamination of the surrounding soil and groundwater, which is especially critical when the fluid product is fuel, chemicals, or the like.

Leaks are often so small that volume lost over time is a fraction of the storage capacity of the tank. Over time, however, significant quantities of product fluid are lost. The slow leak rate makes rapid leak detection particularly difficult. The measurement problem is complicated because underground storage tanks are particularly harsh environments in which to make accurate measurements. For example, temperature changes or changes in barometric pressure affect the product fluid level and the measurement apparatus to such an extent that the volume change caused by a slow leaks is difficult.

Leak detectors, also called fluid level detectors, usually include a float that rides on the surface of the product fluid. The float is attached to some form of position transducer that generates a signal indicating the position of the float relative to some fixed reference position. The float position is monitored over a long period of time to detect leaks. Often, the tank is in use (i.e., having product added and removed) during the measurement, so the leak detector must distinguish between the slow, steady volume change caused by a leak and the more dramatic change caused by normal use.

U.S. Pat. No. 4,850,223 entitled "LEAK DETECTOR", issued on Jul. 25, 1989, U.S. Pat. No. 5,156,042 issued on Oct. 20, 1992, and U.S. Pat. No. 5,209,106 entitled "LEAK DETECTOR FLOAT SYSTEM AND METHOD THEREFOR", issued on May 11, 1993, set forth precision tank monitors which discloses problems involved in making highly accurate accounting of fluid products in storage tanks. These patents set out the problems involved in accurately detecting volume changes caused by environmental conditions such as temperature variation, changes in barometric pressure, and the like.

One of the most important steps in obtaining correct readings is positioning the float as close to its true buoyancy with respect to the product fluid before performing a level measurement of the float. The following two prior approaches involve mechanical solutions to positioning the float. U.S. Pat. No. 5,209,106 discloses a mechanical vibrator placed on the probe such that vibrational waves are delivered down the probe to break the surface tension existing between the float and the fluid. Once the surface tension is broken, the float positions itself within the fluid product based upon the buoyancy of the float in the fluid.

U.S. Pat. No. 5,220,310 issued to Pye on Jun. 15, 1993 pertains to a device having a motion-transmitting rod attached to a float. The rod extends upwardly through a steel core within a linear variable displacement transformer. A motor-driven cam applies a vibrational force that is transferred through a mechanical linkage including a pair of tension springs to the rod and float. After the vibrational force is removed, the float is subjected to three forces: the weight of the float, the float buoyancy force of the liquid, and the spring forces. The float responds to these forces by hunting up and down to seek an equilibrium. The range of the float travel is restricted to the practical range of linear variable displacement transformers and the practical length in which springs may be attached to the motion-transmitting rod member.

A need remains in the industry for a robust leak detector that has high accuracy and is insensitive to environmental conditions.

In general, the prior mechanical float excitation methods set forth above consume significant power due to the mechanical generation and coupling of the excitation signal. Mechanical excitation effectively breaks the surface tension of the float, but consumes significant power in the process. Because liquid level measurement tools are often powered by batteries and must operate reliably over a period of several days or weeks, power consumption is critical to long term usefulness and reliability. Also, the magnitude of voltage and current used to measure fluid levels in storage tanks containing volatile products such as gasoline, jet fuel, chemicals, etc. is of concern. A need exists for a leak detector with high efficiency and low voltage and operating current.

Mechanical excitation systems use motors, vibration transducers, and mechanical linkages that are subject to wear. Also, complex mechanical systems are difficult and expensive to manufacture and repair. Because leak detectors are moved often and must operate in harsh environments, it is desirable to minimize or eliminate any use of mechanical components to position the float.

Hence, a need exists to provide a system for achieving essentially true buoyancy of the float that (1) consumes little power and (2) does not use mechanical vibration while still providing a buoyancy system that operates in the harsh environment of a liquid storage tank. A further need exists to optionally provide self-calibration.

3. Solution to the Problem:

The problems set out above are solved by a leak detector that includes an energy efficient means for excitation of a float to repeatably position the float. The system of the present invention couples a high percentage of vibrational energy to the float itself so that power is not lost in mechanical linkages and vibration of other components. A leak detector that provides positive float movement and settling with respect to the surface of the fluid, that uses lower operating voltage and current and that increases efficiency and safety. The non-mechanical excitation system simplifies construction, transportation, installation, and maintenance of the leak detector. By minimizing mechanical linkages, errors caused by wear and thermal expansion of the components are limited. Also, by including a self-calibration apparatus, errors caused by temperature changes and the like can be accounted for making the leak detector highly accurate and robust.

SUMMARY OF THE INVENTION

Briefly stated, the leak detector of the present invention includes a float having one or a plurality of magnets positioned within it. Electromagnetic coils are disposed along the full length of the possible range of travel of the float within the leak detector. The coils, when current is applied, create a magnetic field that interacts with the magnets in the float. By controlling the pulse shape, frequency, amplitude, phase and duration of the excitation current applied to the coils, the float can be made to move-about and to settle to a position representing its essential true equilibrium buoyancy. This "true" position is repeatable and thus provides a highly accurate measurement of the product fluid level.

Another feature of the present invention is a self-calibration apparatus that is integrated with the leak detector. The self-calibration apparatus includes an electromagnet positioned in a fixed location with respect to a position sensor. A signal is transmitted to the electromagnet and reflected back to the position sensor. Because the electromagnet is in a fixed position, any error in the position sensor can be determined and compensated for when the position sensor is used to determine the float position. The self-calibration apparatus allows the leak detector to compensate for environmental changes and provide consistently accurate measurements.

BRIEF DESCRIPTION OF THE DRAWING

FIG. 7b is a cross-sectional view of a portion of the leak detector in accordance with the present invention at the elevation of the float of FIG. 7a;

DETAILED DESCRIPTION OF THE DRAWING

1. Overview

Figure 1:
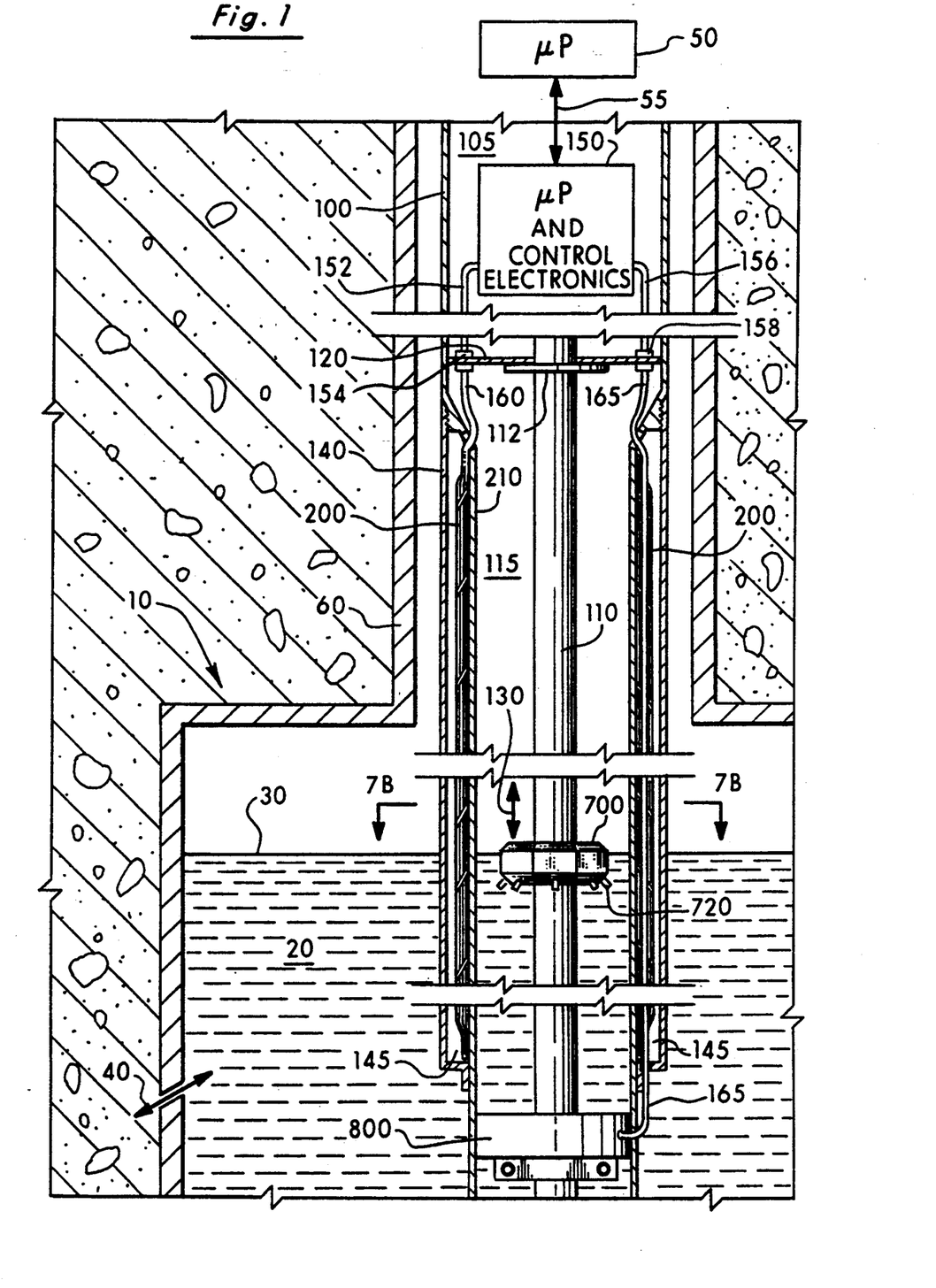
FIG. 1 sets forth a side Cross-sectional view of present invention as it may be deployed in a fluid product storage tank.

FIG. 1 shows a first embodiment in accordance with the present invention as it would be deployed in a fluid product storage tank 10 containing a fluid product 20, such as gasoline. An elongated hollow test probe assembly 100 is inserted extending downwardly into fluid storage tank 10. The fluid level, indicated by numeral 30 in FIG. 1, may change in height from full to empty from time to time due to product being removed from or stored into tank 10. Additionally, tank 10 may have a leak 40 which causes flow into or out from tank 10 effecting level 30. Also, fluid level 30 may rise or fall due to other physical phenomena such as expansion or contraction of fluid product 20 as temperature changes.

The test probe assembly 100 would be suitable for either a portable test instrument being used to periodically test storage tanks or, permanently installed for continuous monitoring of a storage tank. Likewise, although the present invention is particularly suitable for underground storage tanks, above ground storage tanks may also be monitored in accordance with the teaching of the present invention. Fluid product 20 may be any fluid that is compatible (i.e., not corrosive) with the materials used to build test probe assembly 100.

Test probe assembly 100 is hollow and contains in a lower section 115 a central rod 110 affixed by joining member 112 to a support 120. Float 700 is positioned about central rod 110 so as to float freely up and down in the direction of arrow 130 as the fluid level 30 changes. Preferably, float 700 can move up and down over the full length of rod 110. It is important that up and down motion of float 700 not be restrained. Float 700 includes a plurality of magnets 720 which serve a variety of useful functions described hereinafter.

Also, optionally affixed at the lower end of rod 110 is a self-calibration apparatus 800. The self-calibration apparatus 800 includes several series coupled electromagnetic coils (shown in FIG. 8a through 8c) which may be selectively activated to provide calibration and compensation information. Self-calibration apparatus 800 is described in greater detail hereinafter in reference to FIG. 8a through FIG. 8c.

Test probe assembly 100 has a lower section having a protective sleeve 140 and a float enclosure 210 which adjoin at support 120. Excitation coils 200 and 220 (220 shown in FIG. 2) are sandwiched between the float enclosure 210 and the protective sleeve 140. As shown in FIG. 1, test probe assembly 100 with protective sleeve 140 installed over excitation coils 200 and 220 is preferably a single tubular shape from top to bottom, which is, for example, one and seven-eighths inches in outside diameter. This makes a smooth assembly 100 to install into conventional fuel tank pipe risers 60, for example two inches inside diameter without obstruction.

Test probe assembly 100 has an upper compartment 105 in which is sealed and secured a set of electronics including control circuitry 150. Control circuitry 150 preferably includes a microprocessor. Control circuit 150 is coupled by leads 152 through connector 154 and wire harness 160 to excitation coils 200 and 220. Control circuit 150 is also coupled through leads 156, connector 158 and wire harness 165 to self-calibration apparatus 800. Control circuitry 150 delivers electrical analog "excitation signals" to excitation coils 200 and 220 and to self-calibration apparatus 800. Control circuit 150 is preferably fully contained within compartment 105 of the test probe assembly 100. Details of compartment 105 and the delivery of wires 152 and 156 may be adapted to the needs of a particular application and are not presented in greater detail for ease of illustration and description.

Control circuitry 150 communicates with an external microprocessor 50 to receive digital programming instructions and to upload acquired test and monitoring data. Communication path 55 may be a wire, optical, radio frequency, or other well known data link. External processor 50 may be intermittently connected to test probe assembly 100 only during upload operations or, may be permanently connected in applications that require continuous monitoring. Test probe assembly 100 operates under control of control circuitry 150 during normal operation and so can operate autonomously from external processor 50.

In a preferred embodiment, a magnetostrictive linear displacement transducer comprising pulse transmitter and receiver elements (not shown) is mounted in a fixed position in the upper portion of probe assembly 100. Center rod 110 acts as a waveguide for directing measurement pulses to and from the transmitter and receiver elements. Magnetostrictive linear displacement transducers are well known and can be obtained from MTS Systems Corp., Research Triangle park, N.C. 27709 as TEMPSONICS II (R) linear displacement transducer or from Balluff Inc., 8125 Holton Drive, Florence, Ky. 41042.

In operation, the magnetostrictive linear displacement transducer, under control of the microprocessor in control circuit 150, outputs an electromagnetic pulse. The electromagnetic pulse travels through center rod 110 and is reflected by magnetic fields created by magnets 720 in float 700. The reflected electromagnetic pulse travels back through center rod 110 and is detected by the receiver elements (not shown), and the position of float 700 is calculated from the elapsed time between the output pulse and the detected reflected pulse.

In summary the present invention involves a leak detector designed to fit into a fluid product storage tank. The leak detector in accordance with the present invention may be permanently or temporarily installed in the tank. A linear displacement transducer, which is preferably a magnetostrictive transducer, measures the vertical position of the float 700 with respect to a known, fixed position of a self-calibration apparatus 800. Although the preferred embodiment is described in terms of a magnetostrictive transducer, any type of linear transducer, or combination of transducers, may be adapted to the teachings of the present invention.

2. Float Excitation Apparatus

In accordance with the present invention, float 700 is made to settle to its "true" buoyancy position within fluid level 30 by an "excitation apparatus." The excitation apparatus includes control circuit 150, coils 200 and 220, as well as float 700 and magnets 720 positioned therein. The components of the excitation apparatus cooperate to provide power efficient control over the motion of float 700 with respect to fluid level 30.

2a. Excitation Coils 200 and 220

Figure 2:
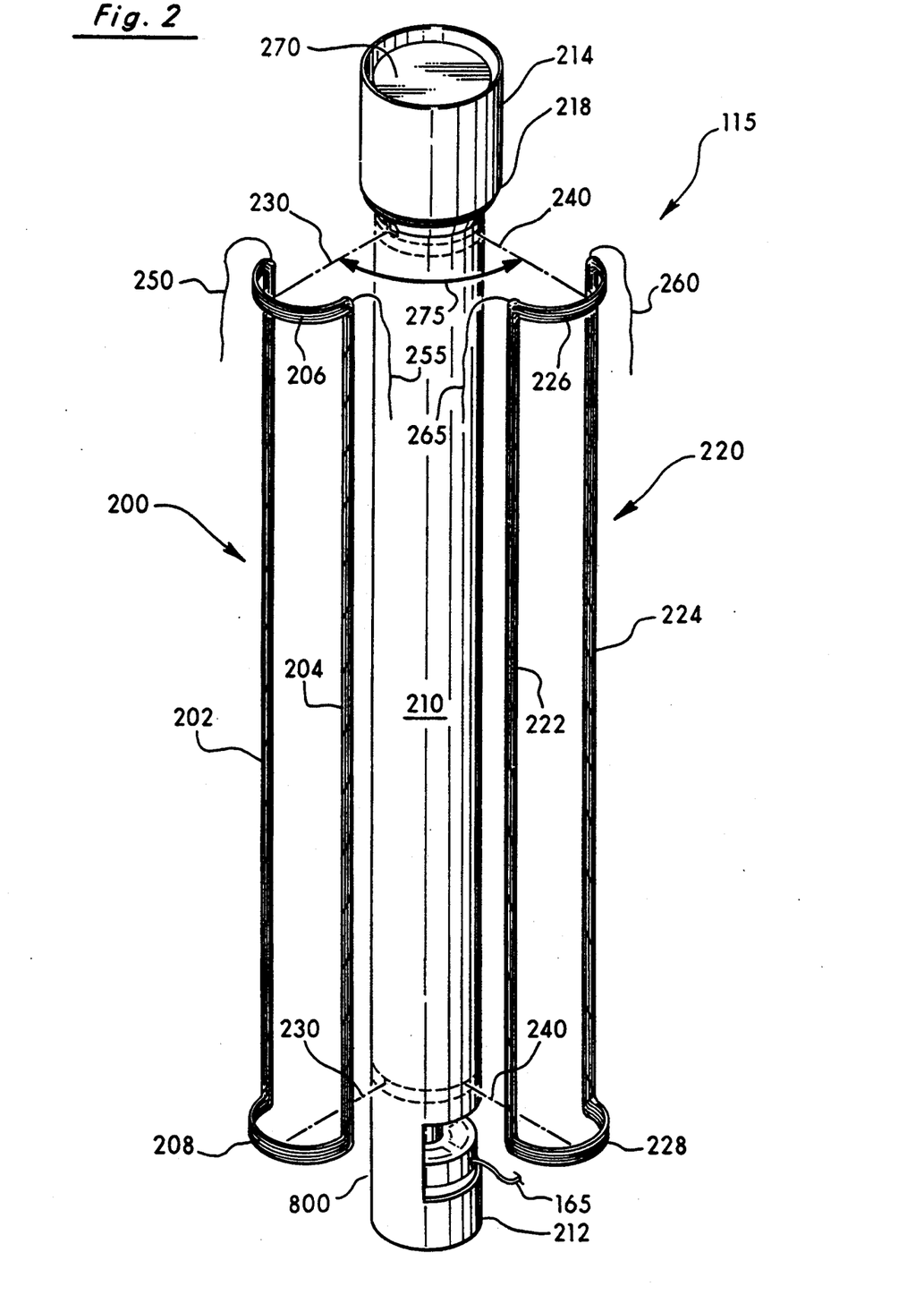
FIG. 2 is an exploded perspective view of the level detector in accordance with the present invention showing details of the excitation coils.

FIG. 2 illustrates a perspective view of the lower section 115 of the test probe assembly 100. Excitation coils 200 and 220 are exploded away from the surface of float enclosure 210 for purposes of illustration, however it should be understood that coils 200 and 220 are preferably positioned on the outer surface of float enclosure 210 when test probe assembly 100 is fully assembled.

Coil 200, comprises a right vertical segment 202, a left vertical segment 204, top segment 206 and bottom segment 208. Coil element 200 additionally has wire leads including start lead 250 and end lead 255. Likewise, coil element 220, includes a front vertical segments 222, a back vertical segment 224, as well as top and bottom segments 226 and 228. Coil element 220 additionally has wire start lead 260 and end lead 265.

Coil element 200 is affixed to float enclosure 210 in such orientation as to have the center of top and bottom segments 206 and 208 aligned with dashed line 230. In like manner, coil element 220 is affixed to float enclosure 210 in such orientation as to have the center of top and bottom segments 226 and 228 aligned with dashed line 240. In the preferred embodiment, dashed line 230 and dashed line 240 intersect at a ninety degree angle, indicated by arrow 275, near a center of float enclosure 210.

Vertical segments 202, 204, 222 and 224 are long enough to span the entire desired or expected travel distance of float 700 (shown in FIG. 1) within float enclosure 210. Top segments 206 and 226 and bottom segments 208 and 228 are approximately as long as one half the outer circumference of float enclosure 210. Top segments 206 and 226 and bottom segments 208 and 228 are also curved to wrap around float enclosure 210 during assembly. Each of the vertical segments 202, 204, 222, and 224 are thus positioned approximately ninety degrees from a nearest other vertical segment about the surface of float enclosure 210.

When excitation coils 200 and 220 are affixed to float enclosure 210 as described, vertical segments 202 and 204 are positioned 180 degrees from each other, and vertical segments 222 and 224 are 180 degrees from each other. The vertical segment 204 is overlapped by vertical segment 222 with each of the vertical segments 202, 204, 222 and 224 being 90 degrees from one another. The designations of right, left, and front, back for vertical segments 202, 204, 222, and 224 are for purposes of illustration only, as the present invention may be used in any orientation.

Any suitable adhesive designed to withstand the environment presented by fluid product 20 may be used to affix excitation coils to the outer surface of float enclosure 210. Epoxy adhesive compound, such as that marketed as J B Weld epoxy, is preferably used. A droplet of adhesive (not shown in FIG. 2) every four to six inches along each of vertical segments 202, 204, 222, and 224 is sufficient to secure the elements to the float enclosure body.

Outer tubular protective sleeve 140 (shown in FIG. 1) slides over coils 200 and 220 once they are attached to float enclosure 210 at the bottom end 212 in so as to sandwich excitation coils 200 and 220 between float enclosure 210 and protective sleeve 140. When protective sleeve 140 is fully installed, a top edge of protective sleeve 140 preferably abuts top end 214 of float enclosure 210 at junction 218. Connectors 154 (shown in FIG. 1) for the wires 250, 255, 260 and 265 are thus protected within the protective sleeve 140.

Figures 3, 4, 5, 6:
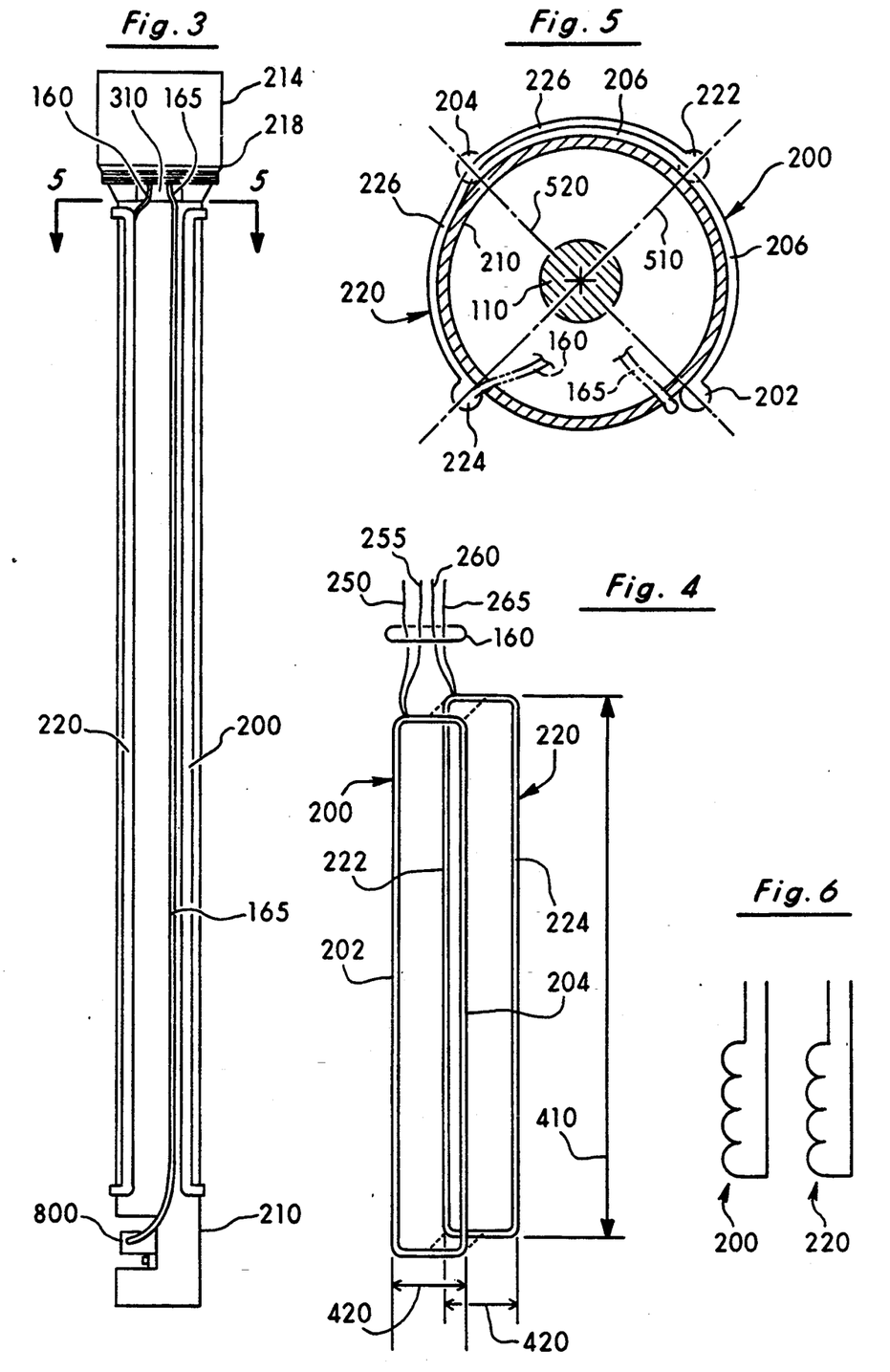
FIG. 3 is a side planar view of FIG. 2.
FIG. 4 is an illustration of the excitation coils before mounting on the leak detector in accordance with the present invention.
FIG. 5 is an end planar view of the leak detector in accordance with the present invention illustrating proper orientation of the excitation coils.
FIG. 6 is a schematic diagram of electronic excitation coils of FIG. 4.

FIG. 3 shows a side planar view of the assembly shown in FIG. 2 with excitation coils 200 and 220 affixed to float enclosure 210. Wire leads 250, 255, 260 and 265 are ganged together to form wire harness 160. Access hole 310 allows the wire leads 250, 255 and 260, 265 of harness 160 to pass through float enclosure 210 into inner space 270 for connections to connector 154 of the electronics earlier discussed. Wire harness 165 of the self-calibration apparatus 800, discussed latter, passes through access hole 310 to couple to connector 158.

FIG. 4, illustrates an exemplary method of manufacturing excitation coils 200 and 220. Length 410, which is the length of the vertical sections 202, 204, 222 and 224, are chosen to match the height from top to bottom of fluid storage tank 40, or to match the desired vertical travel distance of float 700 (shown in FIG. 1). Width 420, which is the width of top and bottom sections 206, 226, 208 and 228, is, in a specific example, 2.1 inches when the outside diameter of float enclosure 210 is 1.375. The coil elements 200 and 220 each consists of, for example, 43 turns of #28 gage magnet wire and terminated with Teflon coated leads 250, 255 and 260, 265 respectively. The coil elements are placed so as to overlap each other by fifty percent when wrapped around float enclosure tube 210 as is indicated in FIG. 2 and FIG. 3.

FIG. 5 shows an end planar view of excitation coils 200 and 220 wrapped around float enclosure 210 showing the vertical sections of the coils 200 and 220 in their proper orientation. Coil segments 202 and 204 are aligned with axis 520, which is perpendicular to a central axis of float enclosure 210. Coil segments 222 and 224 are aligned with axis 510. Axis 510 is substantially perpendicular to axis 520.

FIG. 6 depicts in schematic form the electrical circuit of excitation coils 200 and 220. It is to be expressly understood that the number of turns and the gage of magnet wire may be altered to fit the desired electrical requirements such as drive voltage and drive current. The number of turns and wire gage size directly effect the current efficiency of the excitation coil system of the present invention, as is well known in the field of electromagnet coil design.

It is to be understood that the above discussion is only for the preferred embodiment and that the design and installation of the coils could be performed in other designs under the teachings of the present invention. For example, the location of the coils can be anywhere within an operative electromagnetic range of the float as it travels along the center rod. Any source of electromagnetic field could be used to move the float about as discussed in the text.

2b. Float 700

Figure 7A:
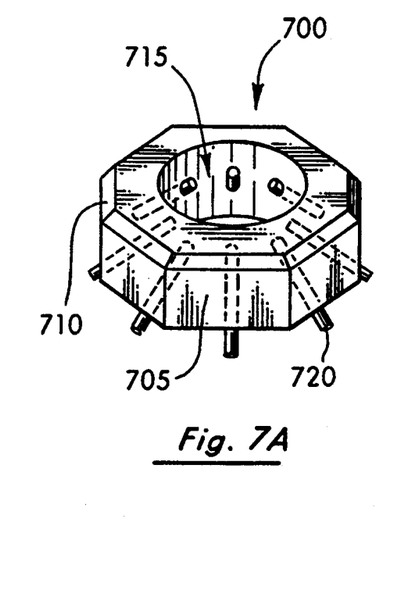
FIG. 7a is a top perspective view of a float device shown in FIG. 1.

FIG. 7a through FIG. 7d illustrate various structural and operational features of float 700. In FIG. 7a, float 700 is shown in a top perspective view showing miniature magnets 720 disposed thereon. Preferably body 705 is octagon shaped and has sloped sides 710. In a specific example, float 700 has a 0.5625 inch hole 715 through the center. Magnets 720 are 0.050 inch diameter by 0.375 inch long in the specific example. Also, magnets 720 are high performance fully saturated magnets of neodymium iron boron. Eight magnets 720 are disposed at approximately 45 degrees from one another in holes around the circumference of the float body in the specific example.

Each magnet 720 is positioned with its north pole pointed inwardly so that an inside diameter formed by the inner tips of magnets 720 is about 0.400 inches in the specific example. Alternatively, each magnet 720 could be oriented with its south pole pointed inwardly, so long as the polarity of each magnet is the same. Each magnet 720 extends out and downwardly at a substantially 40 degree angle to the float body lower exterior.

A working apparatus can be made with the magnet angle in the range of 20 to 60 degrees with respect to the float body lower exterior. The particular angle is chosen to maximize interaction between a magnetic field created by magnets 720 and the magnetic field created by excitor coils 200 and 220. It has been experimentally determined that a 40 degree angle maximizes this interaction in the geometries of the specific example, as is shown in FIGS. 7b through 7d.

Figure 7B:
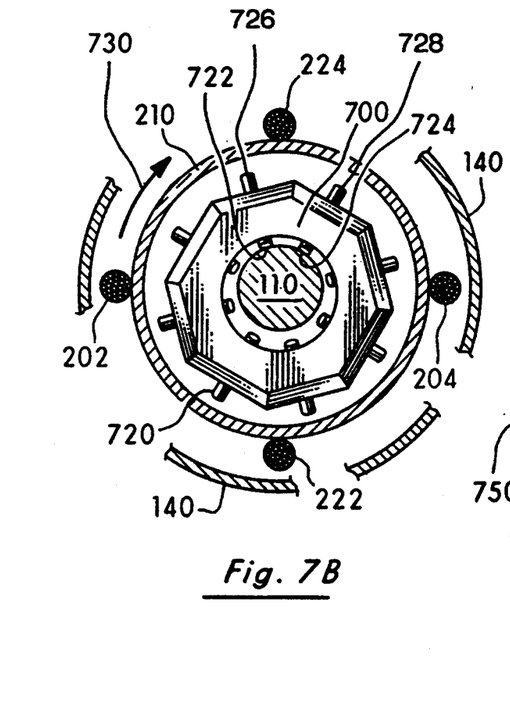
Figure 7C:
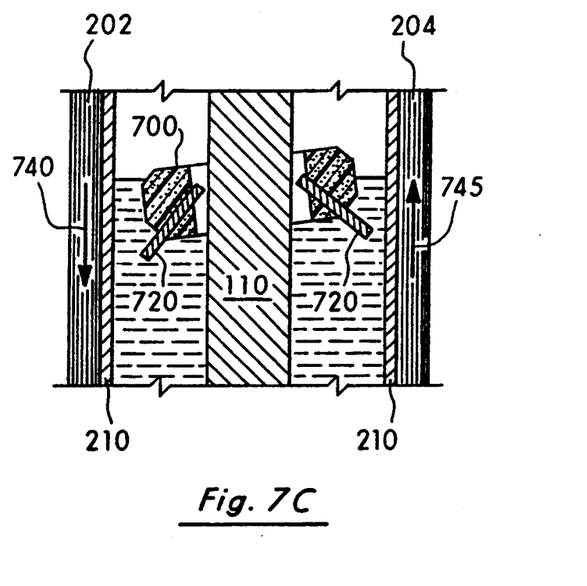
FIG. 7c and 7d illustrate float movement while current is applied to excitation coils.
Figure 7D:
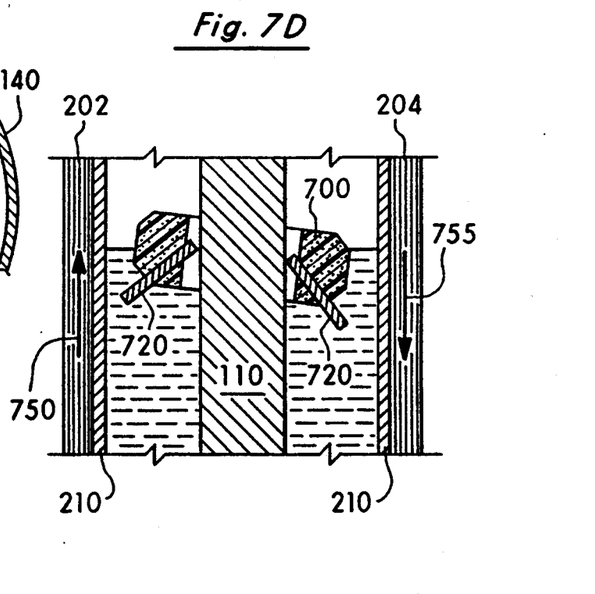

FIG. 7b is a cross-sectional view of the present invention at the elevation of the float of FIG. 7a as it may be in product fluid 20. Vertical elements 202, 204 and 222 and 224 of excitation coils 200 and 220 are in place on float enclosure 210. Note that due to surface tension of the fluid, float 700 is pulled over to one side so as to cause the inner tips 722 and 724 of two of the magnets 720 to touch center rod 110. In the specific example, the 0.400 inch inside diameter of magnets 720 allow center rod 110 (which is 0.375 inch outside diameter) to pass through float 700 with a 0.025 inch clearance. It is possible that any of the eight magnets 720 may touch rod 110 at any given time in this manner.

It is to be expressly understood that the teachings of the present invention are not limited to the above preferred embodiment. Any magnetic structure could be incorporated into the float which is operative with the production of the electromagnetic field. Likewise, the number, shape, location, and orientation of the magnets that are connected to the float may be changed so long as they still interact with the excitation coils.

3. Operation of the Float Excitation Apparatus

For purposes of illustration float 700 is oriented such that none of magnets 720 are aligned with any of the four coil segments 202, 204, 222, and 224. When current is applied to coils 200 and 220, an electromagnetic field is created within float enclosure 210 and magnets 720 align with the coils segments 202, 204,222 and 224. This "self-aligning" feature of the present invention ensures uniform, repeatable, and maximum interaction between the magnetic field created by excitation coils 200 and 220 and magnets 720 in float 700.

In the example of FIG. 7b, float 700 rotates in the direction of arrow 730 because outer magnet end 726 is closer to coil element 224 than is outer magnet end 728 to coil element 224. Each of the coil elements 202, 204 and 222 respectively attract the nearest magnet 720 to help align float 700 to the electromagnetic field of the coil segments 202, 204, 222 and 224 when current is passing through the excitation coils 200 and 220.

In the preferred embodiment, vertical segments 202, 204, 222 and 224 positioned at each of the four ninety degree positions, and magnets 720 at each of the eight 45 degree positions, guarantee that there will always be an interaction between float 700 and excitation coils 200 and 220. The maximum rotation the float 700 of the preferred embodiment shall ever experience is 22.5 degrees, which is well within the flux patterns of the electromagnetic coils 200 and 220 and magnets 720. The directional arrow 730 is for illustration and it must be understood that float 700 is free floating and may rotate in either direction depending on which of the magnet end 726 or 728 are in closest proximity with energized coils segments 202, 204, 222 and 224.

FIGS. 7c and 7d illustrate motion of float 700 while energy is applied to excitation coils. In FIG. 7c, right coil segment 202 pulls float 700 to the right and downwardly and coil segment 204 pulls float 700 left and upwardly. This would be the effect caused by current passing through the coil in the direction of arrows 740 and 745. FIG. 7d shows the effect if the polarity were reversed on coils segment 202 and 204 in the direction of arrow 750 and 755. In this case, float 700 is pulled to the right and upwardly by the right segment 202 and left and downwardly by the left segment 204. In like manner, coil segments 222 and 224 (not shown in FIGS. 7c and 7d), cause float 700 to rock back and forth, upward and downward as current passes through the coils segment 222 and 224 as polarity was being reversed.

4. Self-Calibration Apparatus 800

Figure 8A:
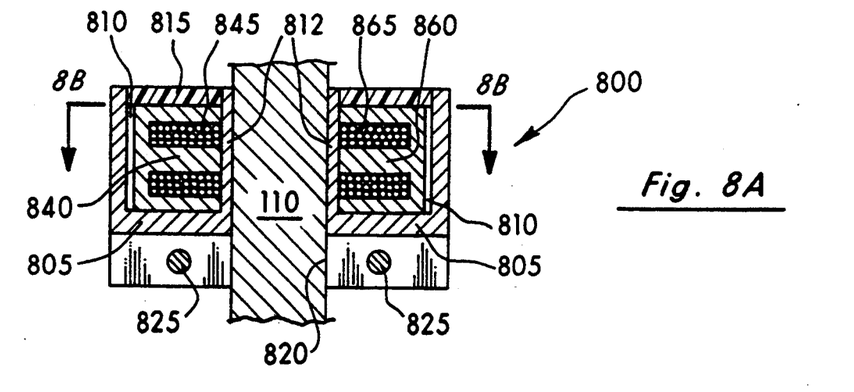
FIG. 8a is a side cross-sectional view of a self-calibration apparatus of the present invention.

FIG. 8a is a side cross-sectional view of an embodiment of the self-calibration apparatus 800 in accordance with the present invention. Housing 805 has a cavity 810 and dividers 812 which compartmentize the inner housing into four areas. Each of the four areas hold an electromagnetic assembly such as core 840 and coil 845. Core 840 has 7 layers of "E" shaped plates of steel and coil 845 includes 325 turns of #33 gage magnet wire comprising coil 845 wrapped around the center arm or tine of the "E" shaped steel plates in the preferred embodiment. The "open" end of the "E" shaped core is facing a center hole 820 of housing 805.

Three other cores 830, 850 and 860 (shown in FIG. 8b) are wound in like manner with the open end of the "E" structure facing inwardly around hole 820. Encapsulant 815 seals electromagnetic assemblies securely in housing 805. A center hole 820 extends through housing 805 which accepts the center rod 110. Securing screws 825, when tightened, permanently holds the self-calibration apparatus in position on the center rod 110.

Figures 8B, 8C:
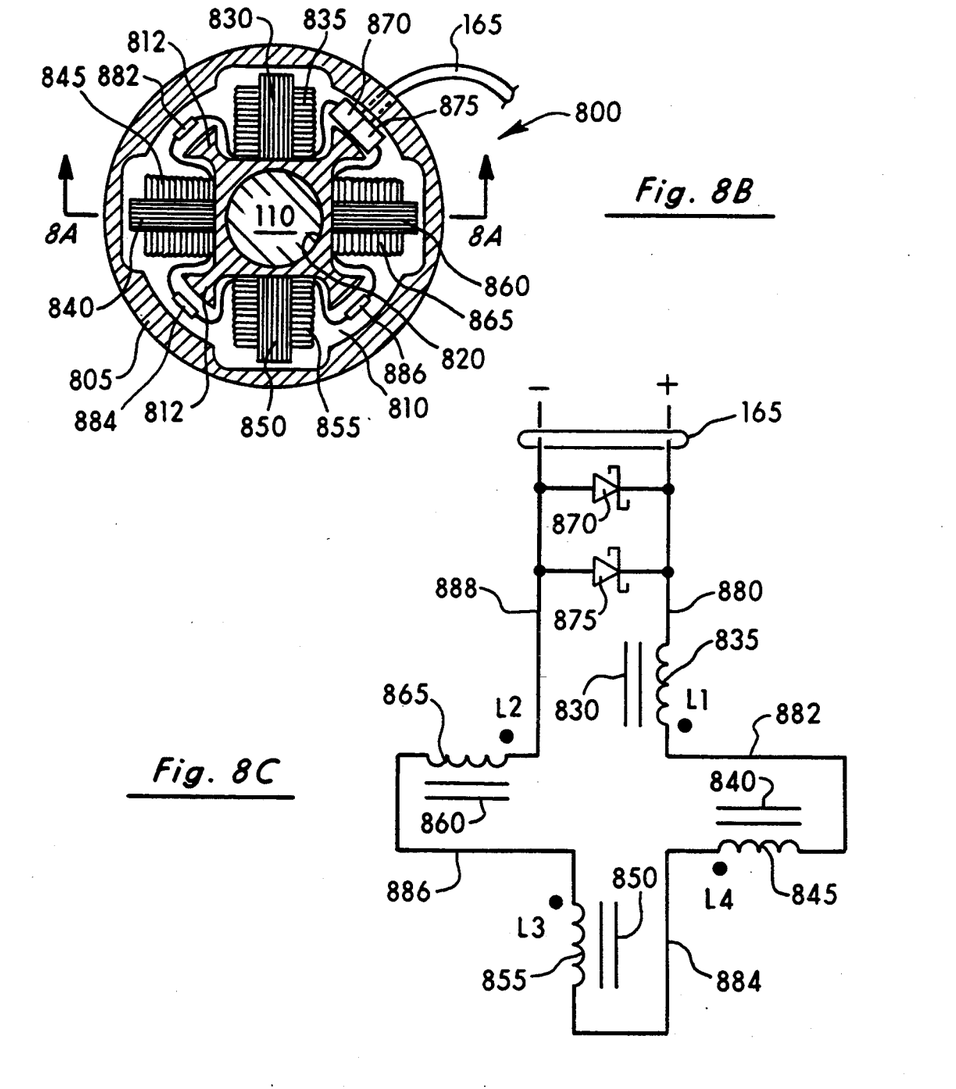
FIG. 8b is a top cross-sectional view of FIG. 8a showing electromagnetic coils.
FIG. 8c is a schematic diagram of electromagnetic coils of FIG. 8b.

FIG. 8b is a top cross-sectional view of FIG. 8a showing electromagnetic assemblies in cavity 810. Winding 835 is connected in series with winding 845 by connector 882. Likewise, winding 845 is connected in series to winding 855 by connector 884 and further in series to winding 865 of core 860 by connector 886.

FIG. 8c shows a schematic diagram of the electromagnetic assemblies of the self-calibration apparatus 800. One or more diodes, such as Schottky diodes 870 and 875, which parallel each other to provide redundancy and extra current handling capacity, are coupled across leads 880 and 888 before exiting the housing 805 in wire harness 165. Diodes 870 and 875 are provided to clamp high voltages which result from an inductive kick when power is removed from series coupled coils 835, 845, 855 and 865. Diodes 870 and 875 are redundant, that is to say each can handle the entire expected current, so that self-calibration apparatus 800 can continue to operate if one fails. Cathodes of diodes 870 and 875 are electrically wired to the positive (+) potential on lead 880. Diodes 870 and 875 also serve to discharge the serially coupled electromagnetic coils 835, 845, 855 and 865 when the operating current is removed from lead 880 and 888.

The inductive effect of coils 835, 845, 855 and 865 acts to reverse the potential across leads 880 and 888 when current is removed so that a positive potential appears at the anode side of the diodes. Because Schottky diodes 870 and 875 break over in the forward direction at 0.3 volts, coils 835, 845, 855 and 865 are immediately shorted. Diodes 870 and 875 must be selected to dissipate the charge stored in coils 835, 845, 855 and 865 without damage, and so more diodes may be required and coupled in parallel as shown in FIG. 8c. This also assures no erroneous magnetic fields effecting readings by the magnetostrictive linear displacement transducer.

5. Operation of the Self-Calibration Apparatus

Coils 835, 845, 855, and 865, when energized, create magnetic fields similar to the magnetic fields of magnets 720 on float 700. This feature is most useful in the present invention when a magnetostrictive linear displacement transducer is used as the level sensing means, as in the preferred embodiment. If another type of linear displacement transducer is used, self-calibration apparatus 800 should be designed to provide another type of signal that is compatible with that linear transducer. What is essential is that self-calibration apparatus 800 is positioned at a fixed position with respect to the linear displacement transducer and so provides a reliable reference position for calibration of the position measurement of float 700.

In operation, the magnetostrictive linear displacement transducer, as controlled by the microprocessor of the control electronics 150, outputs a measurement pulse and waits for a return pulse. The return pulse is essentially the output measurement pulse that echoed or reflected off of the magnetic fields created by magnets 720 or self-calibration apparatus 800.

A first return pulse is echoed or reflected from magnets 720 in float 700 as it is floating in the product fluid 20. Hence, the first return pulse indicates the position of float 700 and the product fluid level 30 (shown in FIG. 1). A measurement of the position of float 700 may involve several hundred repetitions of the processes of outputing a measurement pulse and measuring the return pulse from float 700. The process of making repeated measurements is known as "recirculation". The several hundred measurements are averaged or otherwise statistically combined to calculate a single measurement value. Preferably, this single measurement value is stored in memory in control circuit 150 (shown in FIG. 1). During the measurements of float 700, self-calibration apparatus 800 is not energized to prevent echoes or reflections of the measurement signal from self-calibration apparatus 800 that would confuse or confound the measurements of float 700.

Once the several measurements of float 700 are made, self-calibration apparatus 800 is energized. A second return pulse is echoed or reflected by self-calibration apparatus 800 when the electromagnetic assemblies in self-calibration apparatus 800 are energized. Again, several hundred measurements are taken using the recirculation method and averaged or otherwise statistically combined to calculate a single measurement value. Preferably, this single measurement value is stored in memory in control circuit 150 (shown in FIG. 1). Thus, two independent measurement readings, the first from float 700 and the second from self-calibration apparatus 800, are taken and stored.

While the self-calibration measurements are taken, any reflections of the measurement signal from float 700 over the entire known range of travel of float 700 are electronically "blocked out". In other words, an electronic window or time window is created around the expected arrival of the reflected measurement pulse from self-calibration apparatus 800, and all pulses that are detected outside of this window are ignored. This allows an accurate measurement of self-calibration apparatus 800 despite noise of reflected signals from float 700. The purpose of the self-calibration apparatus data is to give calibration information as to electronic drift in any of the components including control circuit 150 or other circuitry used in the measurement apparatus.

Because self-calibration apparatus 800 is permanently affixed in a fixed position and the exact distance is known between self calibration apparatus 800 and the linear displacement transducer, any discrepancy between the known position and the measured position of self-calibration apparatus 800 calculated from the signal returned by self-calibration apparatus 800 must be caused by component or environmental error. Since the factors bringing about the error closely or identically affect the position measurement of float 700, the reference signal from self-calibration apparatus 800 can be determined and used to compensate the signal returned by float 700 when measuring the position of float 700. Similarly, any distortion caused by thermal effects and electronic drift inherent in magnetostrictive and electronic devices can be "zeroed-out" once the reference signal from self-calibration apparatus 800 is known.

In summary, the method of operating the leak detecting float system in accordance with the present invention begins by initially positioning float 700 in fluid product 20. Excitation coils 200 and 220, for example, are used to provide an initial magnetic field in proximity of float 700 to abruptly move float 700 to break float 700 from surface tension of fluid product 20. Other methods of providing an acceptable magnetic field such as using permanent magnets that are moved into proximity with float 700 may also be used in accordance with the method of the present invention. Preferably a final electromagnetic field is provided in proximity of float 700 to gently move float 700 to a final position near a true buoyancy position.

The position of float 700 is then measured using a magnetostrictive linear displacement transducer in the preferred embodiment. This measurement process is initiated by transmitting a measurement signal to the float through center rod 110. The measurement signal reflects from the magnetic field provided by magnets 720 in float 700 to provide a first reflected signal. Optionally, a measurement of self-calibration apparatus 800 is performed in a similar manner if one is provided.

The reflected measurement signals from float 700 are detected. An elapsed time between the transmission of the measurement signal and detection of the signal from float 700 is determined. This first elapsed time indicates a raw, uncalibrated position of float 700. Preferably several hundred measurements are taken in this manner using the recirculation process, and combined to determine a single measurement value.

The self-calibration apparatus 800 is then energized and second elapsed time between the transmission of the measurement signal and the detection of the signal reflected by self-calibration apparatus 800 is determined. This second elapsed time indicates the position of self-calibration apparatus 800 and serves as a calibration measurement. Again, several hundred measurements are taken and combined using recirculation. Preferably, the measurement of float 700 is stored independently of the measurement of self-calibration apparatus 800.

Once the measurement of float 700 and the calibration measurement are known, a compensated position measurement of float 700 is calculated. This calculation may occur immediately after the measurements are taken, or performed at any convenient time after the measurements are taken when the two measurements are stored as in the preferred embodiment.

6. Control Electronics

Figure 9:
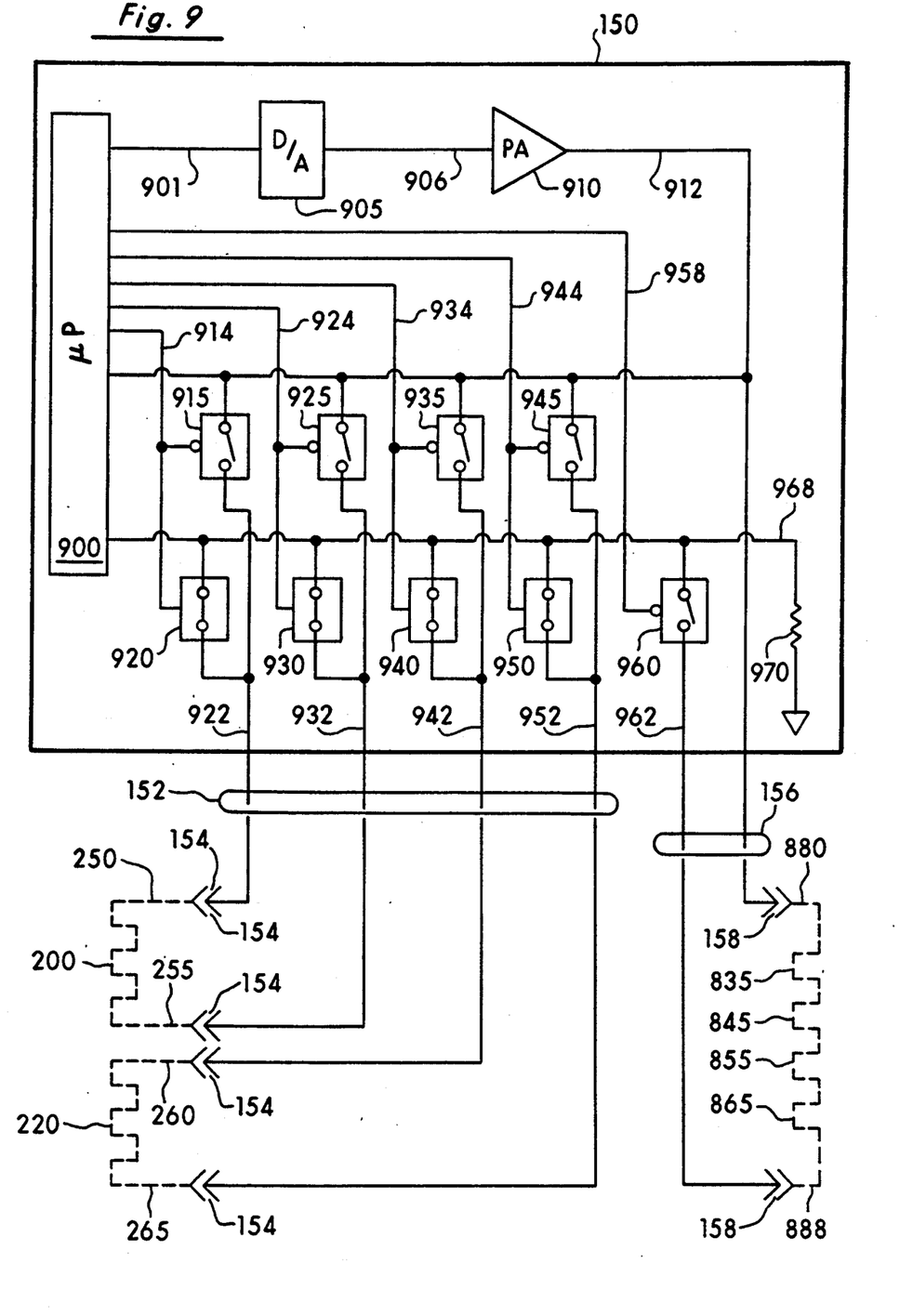
FIG. 9 is a schematic block diagram of the excitation circuitry of the present invention.

FIG. 9 is a schematic block diagram of control electronics 150 of the present invention relating to the control of excitation coils 200 and 220 and self-calibration apparatus 800. Signals from the microprocessor 900 are provided on line 901 and are eight-byte digital coding inputed to digital to analog (D/A) converted 905 in the preferred embodiment.

In the preferred embodiment, the eight-byte data signal yields 256 possible levels for the analog signal output of D/A converter 905 over line 906 to power amplifier 910. Power amplifier 910 is capable of driving all circuitry which is attached over the common line 912. The inputs to electronic switches 915, 925, 935 and 945 receive signals appearing from common line 912 and are further connected back to an analog-to-digital (A/D) converter that is integral to microprocessor 900 for monitoring. Signals on common line 912 are also provided on wire 880 through connector 158.

ON/OFF signals from microprocessor 900 are provided on line 914 and are commonly coupled to control inputs or gates of electronic switches 915 and 920. Electronic switches 915 are preferably solid state devices provided in either discrete or integrated circuit form. Note that electronic switch 915 is a "negative" gate type electronic switch (i.e., a P-channel FET or a PNP bipolar transistor), while switch 920 is a "positive" gate type electronic switch (i.e., an N-channel FET or a NPN bipolar transistor). In other words, the switches 915 and 920 form a complementary pair of switches. The complementary pair of switches 915 and 920 each have one current carrying electrodes coupled in parallel to output lines 922.

Likewise, ON/OFF signals from microprocessor 900 provided over lines 924, 934, and 944 are commonly connected to the control gates of complementary pairs of transistors 925 and 930, 935 and 940, and 945 and 950 respectively. Each switch in each pair of complementary switches has one current carrying electrode coupled to a common output to form output lines 932, 942, and 952. Further, microprocessor control signals over line 958 connect to a control gate of electronic switch 960. One current carrying electrode of switch 660 is coupled to output line 962.

Line 968 is coupled to ground or common potential through resistor 970. Line 968 is also coupled to one of the current carrying electrodes of each of electronic switches 920, 930, 940, 950 and 960. Line 968 is further coupled back to an A/D converter in microprocessor 900 for monitoring.

The outputs of complementary switches 915 and 920 are commonly connected over line 922 to lead 250 through connector 154. Likewise, outputs of 925 and 930 over line 932, 935 and 945 over line 942, and 945 and 950 over line 952 connected to leads 255, 260 and 265 respectively through connector 154.

In operation, microprocessor 900 within control circuitry 150 in the preferred embodiment controls and monitors all activity in a conventional manner by executing program instructions. The amplitude of energy (voltage and current) available to excitation coils 200 and 220 is determined by power amplifier 910. Power is selectively switched to coils 200 and 220 by electronic switches 915, 925, 935 and 945 as "ON" signals appear over line 914, 924, 934 and 944 respectively.

Electronic switches 920, 930, 940 and 950 react opposite to the "ON" signals by switching off. That is, for each set of complimentary electronic switches 915 and 920, 925 and 930, 935 and 940, and 945 and 950 only one is activated at a time for a given signal on the control lines 914, 924, 934 and 944 respectively. An "ON" signal the control lines 914,924, 934 and 944 causes switches 915, 925, 935 and 945 to activate or become conductive, while an "OFF" signal would cause switches 920, 930, 940 or 950 to activate.

When electronic switches 920, 930, 940 or 950 are activated, a ground potential is applied to the excitation coils 200 and 220 over lines 922, 932, 943 and 952 respectively. While a ground potential is the most convenient potential to apply through switches 920, 930, 940 and 950, it should be understood that any potential, fixed or variable, might be applied rather than ground potential to meet the needs of a particular application.

Electronic switch 960 has an output connected to wire lead 888 over line 962 through connector 158. Switch 960, upon activation by an "ON" signal over line 958 couples the ground potential from line 968 to wire lead 888 of electromagnetic coil 865.

It is important to understand the function of monitoring the output energy source of the power amplifier 910 over line 912 and the ground potential through resister 970 over line 968 by the microprocessor. The signal over line 912 gives positive confirmation that a desired energy level has been produced by the power amplifier 910. Further, as each of the electronic switches 920, 930, 940, 950 or 960 are activated, the current drawn over line 968 is measured by the microprocessor. In this way control circuit 150 can determine if either of excitation coils 200 or 220 has developed an "open" wire and is malfunctioning and thereby not giving excitation to float 700. Likewise, control circuit 150 can determine if the electromagnets of self-calibration apparatus 800 are functioning properly. Any level reading of float 700 or self-calibration apparatus 800 while experiencing an open wire malfunction, could be properly indicated as "flawed" measurements and data not relayed upon, and further to give notice for repair.

To produce a desired frequency of the excitation signal applied to excitation coils 200 and 220, electronic switches 915, 925, 935 or 945 are toggled on and off under control of microprocessor 900. Pulse duration for each pulse in the excitation signal is controlled by controlling the elapsed time switches 915, 925, 935 or 945 are activated ON.

An "in phase" case occurs when coil segments 250 and 260 are coupled to power amplifier 910 as ON signals appear over lines 914 and 934, while the ground potential coupled to coils segments 255 and 265 as OFF signals appear over lines 924 and 944. An "out of phase" case occurs when coil segments 250 and 265 are coupled to power amplifier 910 as ON signals appear over lines 914 and 944, while the ground potential coupled to coils segments 255 and 260 as OFF signals appear over lines 924 and 934. Exactly opposite of the above may be selected by reversing which coil segments is coupled to power amplifier 910 and which is coupled to ground potential.

The pulse shape of the excitation signal presented to the excitation coils is controlled by D/A converter 905 and power amplifier 910. A square wave is generated by switching D/A converter 905 between two fixed amplitudes. Alternatively, the pulse may be sloped-shaped with a linear, progressively increasing amplitude followed by a linear progressively deceasing amplitude output of D/A converter 905 and power amplifier 910. A sine wave may be achieved similarly with consideration given to rounding the signal. The combination of using various shaped signals at various frequencies, and the use of the amplitude, duration, phase and frequency in the activating of coils 200 and 220 cause precision excitation of float 700.

One example of this combined effect is likened to a coin being spun on end. It first would rotate rapidly on end an as its inertia diminished, it would start to wobble followed by a rolling on its corner edge. Finally the coin would wobble increasing in its rotational frequency as its side becomes lower and lower to the surface until it settles gently to a stop flat on the surface.

Figures 10, 11:
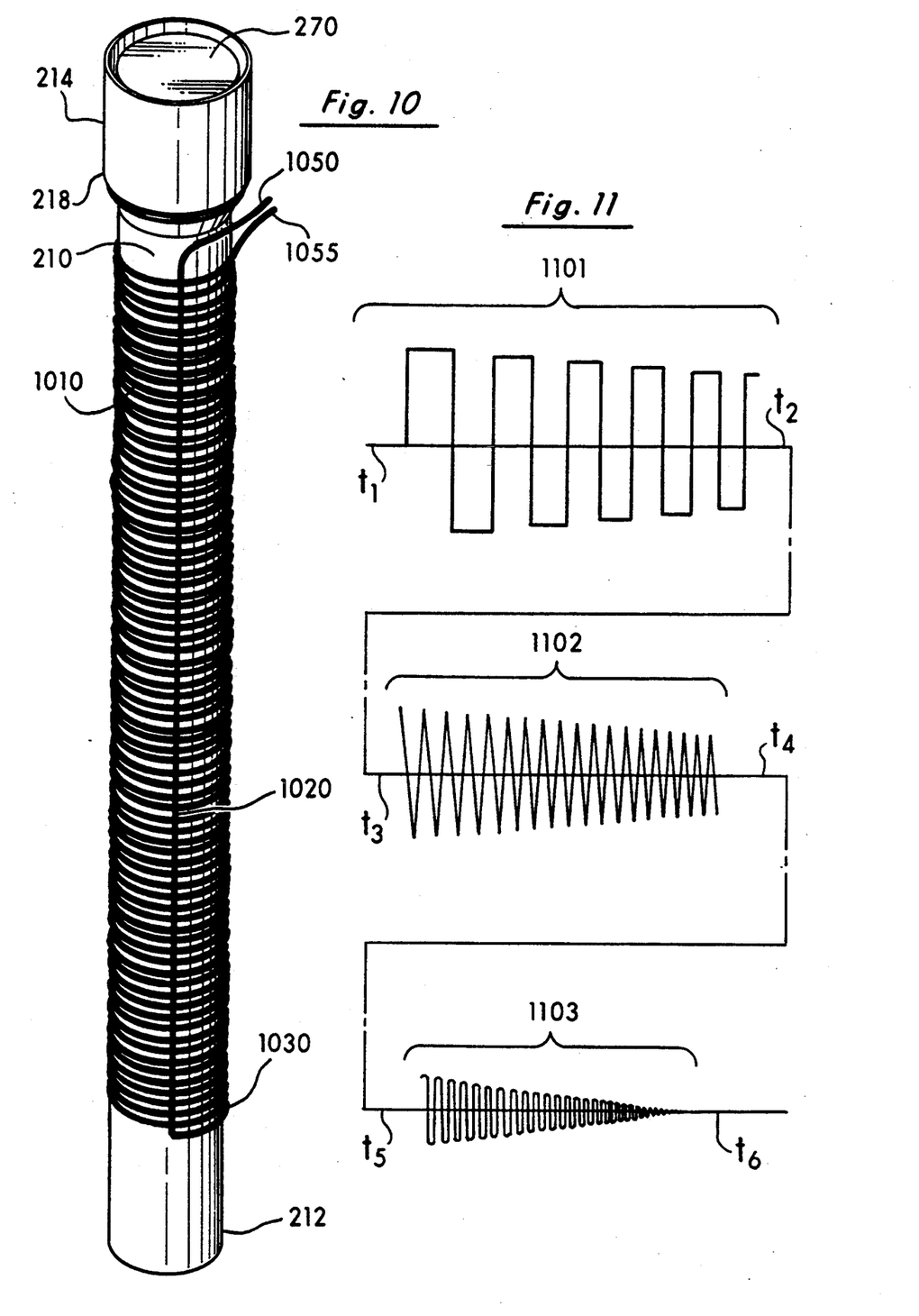
FIG. 10 sets forth a side perspective illustration of an alternate embodiment showing a rotationally wound coil.
FIG. 11 illustrates a waveform diagram of a preferred excitation waveform in accordance with the present invention.

In a preferred embodiment, the excitation signal is designed to draw float 700 from side to side and back and forth while being drawn up and down, giving a warbling effect like the coin mentioned above as it breaks the surface tension. An example excitation waveform for one of coils 200 or 210 is shown in FIG. 11. In FIG. 11, the horizontal axis represents time and the vertical axis represents current amplitude in excitation coil 200 or 220.

An initial time period 1101 spanning from $t_1$ to $t_2$ has a square-wave shaped wave of relatively large magnitude and abrupt changes in current. The abrupt excitation during time period 1101 serves to break float 700 free from surface tension. The phase is switched in the second half of each pulse (i.e., the portion of each pulse below the centerline). The amplitude steadily diminishes and frequency increases through time period 1101.

As the excitation period advances towards intermediate time period 1102, spanning from $t_3$ to $t_4$, a more subtle combination of excitation signals allows float 700 to go into a quiver settling as the float finds its true buoyancy. Here, again, the phase is switched to produce the second half of each pulse, but a more gentle slope is used to reduce the movement of float 700 as the signals gradually diminish during time period 1102.

During a final time period 1103, spanning from $t_5$ to $t_6$, the wave shape is rounded like a sine wave, amplitude is lower, and frequency higher than during initial time period 1101. At the end of time period 1103, movement of float 700 diminishes to a stop—leaving float 700 fully settled at near-perfect equilibrium. At this point, a level reading may be taken of float 700 to accurately and repeatably measure its position.

The preferred sequencing of pulses in the excitation waveform shown in FIG. 11 is only an example of a possible scheme to indicate the float control that the present invention provides. It is possible that a less complex excitation scheme could provide adequate performance in a particular application. For example, a single pulse shape could be used for all time periods 1101, 1102, and 1103. Alternatively, pulse amplitude and or frequency could remain constant or vary non-linearly throughout each time period.

It is to be expressly understood that any number of excitation coils 200 or 220, with appropriate drive circuitry such as 915 and 920, may be used in the present invention. For example, two additional sets of excitation coils 200 and 220, totaling eight segments, could be cycled on and off around the circumference of the float body to create the rotational spinning of the float 700. Which in effect, would "screw" or "twist" the float into its true buoyant position. Further, the necessity of the float enclosure 210 could be foregone and suspend the excitation coils in free space around the float 700. The approach shown in the present patent is exemplary of one approach an is the preferred embodiment.

Components illustrated in schematic block diagram form in FIG. 9 represent components that are commonly available in a diversity of configurations from many manufacturers. Such components are easily connected to one another by those skilled in electronics. It is to be expressly noted that while construction details for coils shown in FIG. 9, such as the number of turns, wire size and wire length have been set forth and discussed for electronics shown in FIG. 9, other windings and number of turns may be substituted to result in the same function in accordance with the present invention.

FIG. 10 illustrates a side perspective of an alternate embodiment similar to the view of the first embodiment shown in FIG. 2. In this embodiment, a coil 1010 is wound directly onto float enclosure 210. A process of winding coil 1010 begins near a top end 214 of float enclosure 210 with wire start lead 1050. Wire start lead 1050 is coupled to beginning length 1020 which extends along the desired length of travel of float 700 (shown in FIG. 1). Coil 1010 including beginning length 1020 spans a length similar to length 410 indicated in FIG. 4.

A first turn 1030, located at a bottom end 212, is wrapped around the outer surface of float enclosure 210, preferably in a counterclockwise direction. First turn 1030 will wrap over or on top of beginning length 1020, as do all the other turn or loop of coil 1010. Hence, beginning length 1020 is protected from damage by the loops of coil 1010. The winding process is continued with each turn or loop of coil 1010 positioned tightly against the previous turn or loop. The winding process is continued until coil 1010 extends near top end 214 of float enclosure 210. Wire end lead 1055 couples to a last turn or loop in coil 1010 and is preferably adjacent to wire start lead 1050.

Coil 1010 is excited in a manner similar to that described in reference to coils 200 and 220, except only one coil need be excited. Power amplifier 910 (shown in FIG. 9) and complementary switch pairs 915, 920 and 925, 930 are used to supply power to start lead 1050 and end lead 1055. Current passing through coil 1010 creates a magnetic field within float enclosure 210.

The magnetic field thus created interacts with magnets 720 in float 700 to move float 700 up and down within float enclosure 210. This up and down motion causes float 700 to find its true buoyancy. The up and down motion of the alternative embodiment should be compared to the back and forth rocking motion created by coils 200 and 220 in the preferred embodiment. In either the first or second embodiments, float 700 is efficiently excited and caused to break any surface tension of float 700 in product fluid 20 (shown in FIG. 1) without having to vibrate the entire assembly 100.

The magnetic field can be controlled by changing polarity (i.e., direction of current flow) and by controlling pulse shape, frequency, amplitude and duration of the current flow in coil 1010. A preferred excitation wave pattern, illustrated in FIG. 11, begins as a low frequency, high amplitude square wave pulse (or series of pulses) sufficient to break float 700 free of the effects of surface tension. Subsequent pulses decrease in amplitude and pulse shape changes from an abrupt square wave to more gentle shapes such as a sloping triangle wave or sine wave. Subsequent pulses also increase in frequency to cause float 700 to change from abrupt turbulent motion to a gentle quivering stir. Finally, the pulse amplitude diminishes to bring float 700 to a gentle fluttering motion as it fully positions itself to a tranquil stop at true buoyancy equilibrium.

It has been found that a leak detector constructed and operated in accordance with the teachings of the present invention offers power efficiency as well as low operating voltages and currents so as to be approved for uses in volatile fluid storage systems. Most importantly, a leak detector in accordance with the present invention has been tested and shown to provide a probability of detecting a leak and a probability of a false reading (i.e., detecting a leak where none exists or not detecting a leak when one does exists) which greatly exceed current government requirements for accuracy and are attributable in large part to the precise and repeatable settling of float 700 at its true buoyancy before measurements are taken.

It is to be expressly understood that the claimed invention is not to be limited to the description of the preferred embodiment but encompasses other modifications and alterations within the scope and spirit of the inventive concept. For example, the overall geometry of the leak detector may be modified to have any convenient cross-section shape to meet the needs of a particular application. More excitation coils may be used. The circuitry used to drive the excitation coils may be modified and still provide useful operation in accordance with the present invention. Accordingly, these and other modifications are within the scope and spirit of the present invention.

We claim:

1. A leak detecting float system for use in a tank storing fluid product to measure a surface level of the fluid product, the leak detecting float system comprising:
    a float for floating on the surface of the fluid product;
    a magnetic structure connected to the float;
    a float enclosure positioned vertically in the tank and extending at least to the surface of the fluid product; and
    electromagnetic means positioned in proximity to the float enclosure for generating an electromagnetic field within the float enclosure, the electromagnetic field operative on the magnetic structure for controllably moving the float with respect to the surface level of the fluid product so as to finally position the float at a repeatable position with respect to the surface level of the fluid product.

2. The leak detecting float system of claim 1 wherein said magnetic structure comprises a plurality of magnets.

3. The leak detecting float system of claim 2 wherein the plurality of magnets are positioned at regular intervals around a circumference of the float.

4. The leak detecting float system of claim 3 wherein each of the plurality of magnets has a first pole and a second pole and each of the plurality of magnets is aligned so that the first pole points upwardly and inwardly towards a central axis of the float at a predetermined angle to a bottom surface of the float.

5. The leak detecting float system of claim 3 wherein the plurality of magnets comprises eight magnets and the regular intervals are substantially forty-five degree arcs about the circumference.

6. The leak detecting float system of claim 4 wherein the predetermined angle is selected to maximize interaction between each of the plurality of magnets and the electromagnetic means.

7. The leak detecting float system of claim 6 wherein the predetermined angle is substantially forty degrees.

8. The leak detecting float system of claim 1 wherein the electromagnetic means for generating an electromagnetic field within the float enclosure comprises at least one excitation coil positioned outside the float enclosure so that the excitation coil creates the electromagnetic field when an excitation current passes through the excitation coil.

9. The leak detecting float system of claim 8 wherein each of the at least one excitation coils has a first end and a second end for providing the excitation current through each of the at least one excitation coils, the leak detecting system further comprising:

means for generating the excitation current so as to control at least one of the following:
i) pulse shape of the excitation current;
ii) frequency of the excitation current;
iii) amplitude of the excitation current;
iv) phase of the excitation current; and
v) duration of the excitation current.

10. The leak detecting float system of claim 9 wherein the means for generating the excitation current comprises:

a first voltage source;
a second voltage source;
first means having a first control input for electrically coupling either the first or the second voltage source to the first end of the excitation coil in response to a first control signal received by the control input;
second means having a second control input for electrically coupling either the first or the second voltage source to the second end of the at least one excitation coil in response to a second control signal received by the second control input; and
a control circuit for providing first and second control signals to the first control input and the second control input.

11. The leak detecting float system of claim 10 wherein the first voltage source comprises a programmable voltage source having a control input for receiving a digital control signal from the control circuit and the second voltage source is a ground potential.

12. The leak detecting float system of claim 10 wherein the first means for electrically coupling comprises:

a pair of complementary switches, each having a control electrode, wherein the control electrodes are coupled together to form the first control input;
a first of the pair of complementary switches having a current carrying electrode coupled to the first voltage source and a current carrying electrode coupled to the first end of the coil, and
a second of the pair of complementary switches having a current carrying electrode coupled to the second voltage source and a current carrying electrode coupled to the first end of the coil, wherein only one of the pair of complementary switches is conductive in response to any control signal.

13. The leak detecting float system of claim 1 wherein the electromagnetic means for generating an electromagnetic field comprises:

a first excitation coil having a first top segment, a first bottom segment, and first and second vertical segments connecting the top and bottom segments to form a continuous coil, the top and bottom segments being sized and shaped to conform to an outer surface of the float enclosure and to position the two vertical segments at substantially 180 degrees from each other with respect to a central axis of the float enclosure so that a first magnetic field is created when an excitation current passes through the first excitation coil; and a second excitation coil having a second top segment, a second bottom segment, and third and fourth vertical segments connecting the top and bottom segments to form a continuous coil, the second top and second bottom segments being sized and shaped to conform to the outer surface of the float enclosure and to position the third and fourth vertical segments at substantially 180 degrees from each other with respect to the central axis of the float enclosure so that a second electromagnetic field is created when an excitation current passes through the second excitation coil.

14. The leak detecting float system of claim 13 wherein the first and second excitation coils are affixed to the float enclosure so as to position the first, second, third, and fourth vertical segments at substantially 90 degrees from each other with respect to the central axis of the float enclosure.

15. The leak detecting float system of claim 1 further comprising:

means for measuring a vertical position of the float; and
a self-calibration apparatus positioned at a fixed distance from the means for measuring, the means for measuring also measuring the vertical position of the self-calibration apparatus, the means for measuring using the vertical position of the self-calibration apparatus for calibrating the measured vertical position of the float.

16. A leak detecting float system for use in a tank storing fluid product to measure a surface level of the fluid product, the leak detecting float system comprising:

a float for floating on the surface of the fluid product;
a plurality of magnets connected to the float and positioned at regular intervals around a circumference of the float, wherein each of the plurality of magnets has a first pole and a second pole and each of the number of magnets is aligned so that the first pole points upwardly at a predetermined angle towards a central axis of the float;
a float enclosure surrounding the float positioned vertically in the tank and extending at least to the surface of the fluid product; and
a first excitation coil positioned in proximity to the float enclosure and having first and second vertical segments extending along a desired length of travel of the float for generating a first electromagnetic field within the float enclosure when an excitation current passes through the first excitation coil;
a second excitation coil positioned in proximity to the float enclosure and having third and fourth vertical segments extending along the desired length of travel of the float for generating a second electromagnetic field within the float enclosure when an excitation current passes through the second excitation coil, the first and second excitation coils positioned so that the first, second, third and fourth vertical segments are substantially 90 degrees from each other, the first and second magnetic fields controllably moving the float with respect to the surface level of the fluid product so as to finally position the float at a repeatable position with respect to the surface level of the fluid product;
a control circuit coupled to the first and second excitation coils for providing the first and second excitation currents;
means for measuring the position of the float; and a self-calibration apparatus positioned at a fixed distance from the means for measuring, the self-calibration apparatus providing a calibration signal to the means for measuring.

17. A leak detecting float system for use in a tank storing fluid product to measure a surface level of the fluid product, the leak detecting float system comprising:
   means for generating a measurement signal;
   a float for floating on the surface of the fluid at a variable distance from the means for generating;
   a first means for reflecting the measurement signal from the means for generating to provide a first reflected signal, the first means for reflecting connected to the float;
   a second means for reflecting the measurement signal from the means for generating to provide a second reflected signal, the second means for reflecting positioned at a fixed distance from the means for generating, wherein the second means for reflecting only reflects the measurement signal when it is energized;
   means for controllably energizing the second means for reflecting; and
   means for receiving the first and second reflected signals; and
   means responsive to the first and second reflected signals for determining a position of the float.

18. The leak detecting float system of claim 17 wherein the second means for reflecting the measurement signal comprises at least one electromagnetic coil.

19. The leak detecting float system of claim 18 wherein the means for controllably energizing further comprises:
   a control circuit for generating a control signal;
   a power amplifier coupled to one terminal of the at least one electromagnetic coil; and
   a switch having a control input for receiving the control signal and current carrying electrodes coupled to the electromagnetic coil so as to interrupt current flow in the electromagnetic coil in response to the control signal.

20. The leak detecting float system of claim 17 wherein the second means for reflecting the measurement signal comprises four series coupled electromagnetic coils, each of the four electromagnetic coils positioned approximately ninety degrees from each other with respect to a central axis of the second means for reflecting.

21. The leak detecting float system of claim 20 wherein each of the four electromagnetic coils are oriented so that an axis passing through a middle of each coil perpendicularly intersects the central axis.

22. The leak detecting float system of claim 19 wherein each of the four electromagnetic coils is wound on a center tine of an "E-shaped" core.

23. The leak detecting float system of claim 20 further comprising:
   a round housing having a central hole aligned with the central axis; and
   four dividers extending away from the central hole to form four compartments within the housing so that each of the electromagnetic coils is positioned in one of the four compartments.

24. A method for operating a leak detecting float system for use in a tank for storing fluid product to measure a level of a surface of the fluid, the method comprising the steps of:

initially positioning a float in the fluid product, the float having at least one magnet positioned therein;
providing an electromagnetic field in proximity of the float to finally position the float by causing the float to move with respect to the fluid product so as to break the surface tension between the float and the fluid product and to settle the float near a true buoyancy position; and
measuring the position of the float.

25. The method of claim 24 further comprising the step of varying the electromagnetic field to cause the float to rock in the fluid product.

26. The method of claim 24 wherein the step of providing an electromagnetic field comprises passing an excitation current through at least one excitation coil, the excitation current comprising a current waveform having an initial portion with a first amplitude and a first frequency and a final portion occurring after the initial portion, the final portion having a second amplitude and second frequency, the first amplitude being greater than the second amplitude and the first frequency being less than the second frequency.

27. The method of claim 26 wherein the initial portion is square wave and the final portion is a sine wave.

28. The method of claim 26 wherein the initial portion is a square wave and the final portion is a triangle-shaped wave.

29. A method for operating a leak detecting float system for use in a tank storing fluid product to measure a surface level of the fluid product, the method comprising the steps of:
   initially positioning a float in the fluid product, the float having at least one magnet positioned therein;
   providing an initial electromagnetic field in proximity of the float to abruptly move the float to break the float from surface tension of the fluid product;
   providing a final electromagnetic field in proximity of the float to gently move the float to a final position near a true buoyancy position;
   measuring the position of the float, including the steps of:
      i) transmitting a measurement signal to the float,
      ii) reflecting the measurement signal from the float to provide a first reflected signal,
      iii) detecting the first reflected signal,
      iv) determining a first elapsed time between step i) and step iii), and
      v) calculating the position of the float from the first elapsed time,
      vi) repeating step i) through step iv) a predetermined number of times;
   determining a calibration measurement including the steps of:
      a) transmitting a measurement signal to a fixed position calibration apparatus,
      b) reflecting the measurement signal from the calibration apparatus to provide a second reflected signal,
      c) detecting the second reflected signal,
      d) determining a second elapsed time between step a) and step c), and
      e) calculating the calibration measurement from the second elapsed time,
      f) repeating step a) through step e) a predetermined number of times; and
   calculating a compensated position measurement of the float using the calculated position of the float and the calibration measurement.

* * * * *